(12) United States Patent
Shi et al.

(10) Patent No.: US 11,272,517 B2
(45) Date of Patent: Mar. 8, 2022

(54) RESOURCE ENERGY DETERMINING METHOD AND APPARATUS

(71) Applicant: HUAWEI TECHNOLOGIES CO., LTD., Guangdong (CN)

(72) Inventors: Yi Shi, Beijing (CN); Zhenwei Lu, Beijing (CN); Zhenshan Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

(21) Appl. No.: 16/265,360

(22) Filed: Feb. 1, 2019

(65) Prior Publication Data

US 2019/0166604 A1 May 30, 2019

Related U.S. Application Data

(63) Continuation of application No. PCT/CN2016/094703, filed on Aug. 11, 2016.

(51) Int. Cl.
*H04W 72/08* (2009.01)
*H04W 72/04* (2009.01)
(Continued)

(52) U.S. Cl.
CPC ....... *H04W 72/085* (2013.01); *H04W 72/044* (2013.01); *H04W 4/46* (2018.02);
(Continued)

(58) Field of Classification Search
CPC . H04W 72/085; H04W 72/044; H04W 24/10; H04W 72/1215; H04W 4/46; H04W 88/02; H04W 72/0406; H04W 72/12
See application file for complete search history.

(56) References Cited

U.S. PATENT DOCUMENTS

| | | | | |
|---|---|---|---|---|
| 2012/0155318 | A1* | 6/2012 | Zhang | H04W 16/14 370/252 |
| 2014/0369292 | A1* | 12/2014 | Wu | H04W 72/04 370/329 |

(Continued)

FOREIGN PATENT DOCUMENTS

| | | |
|---|---|---|
| CN | 102006124 A | 4/2011 |
| CN | 103209487 A | 7/2013 |

(Continued)

OTHER PUBLICATIONS

Catt,"Resource allocation mechanism in mode 2" R1-141194 3GPP TSG RAN WG1 Meeting #76bis, Shenzhen, China. Mar. 31-Apr. 4, 2014, 4 pages.

(Continued)

*Primary Examiner* — Rina C Pancholi
(74) *Attorney, Agent, or Firm* — Fish & Richardson P.C.

(57) ABSTRACT

Embodiments of the present disclosure relate to the field of vehicle to vehicle communications technologies, and provide a resource energy determining method and apparatus. An example method includes: obtaining, by first user equipment (UE), time-frequency resource indication information and resource cycle reservation information of second UE in a sensing time window of the first UE; determining, by the first UE, energy of a first resource based on the time-frequency resource indication information of the second UE; and determining, by the first UE, where a time-frequency domain location of the first resource in a transmission period in which the first resource is located is the same as a time-frequency domain location of each of the at least one second resource in a transmission period in which the second resource is located.

20 Claims, 13 Drawing Sheets

(51) Int. Cl.
  *H04W 24/10* (2009.01)
  *H04W 72/12* (2009.01)
  *H04W 4/46* (2018.01)
  *H04W 88/02* (2009.01)

(52) U.S. Cl.
  CPC ........ *H04W 24/10* (2013.01); *H04W 72/1215* (2013.01); *H04W 88/02* (2013.01)

(56) References Cited

U.S. PATENT DOCUMENTS

| | | | | |
|---|---|---|---|---|
| 2015/0215903 | A1* | 7/2015 | Zhao | H04W 72/04 370/329 |
| 2015/0326373 | A1* | 11/2015 | Ryu | H04L 5/0092 370/330 |
| 2015/0341856 | A1* | 11/2015 | Nord | H04W 52/0212 455/426.1 |
| 2016/0183276 | A1* | 6/2016 | Marinier | H04W 72/12 370/329 |
| 2016/0205647 | A1* | 7/2016 | Seo | H04W 4/70 370/252 |
| 2016/0278003 | A1* | 9/2016 | Kim | H04L 5/00 |
| 2016/0278120 | A1* | 9/2016 | Ro | H04W 74/002 |
| 2016/0345313 | A1* | 11/2016 | Zhao | H04W 72/0446 |
| 2018/0110060 | A1* | 4/2018 | Huang | H04W 72/1284 |
| 2018/0263052 | A1* | 9/2018 | Xu | H04Q 11/02 |
| 2018/0359659 | A1* | 12/2018 | Cai | H04W 28/26 |
| 2019/0075548 | A1* | 3/2019 | Lee | H04W 4/40 |
| 2019/0090250 | A1* | 3/2019 | Lee | H04W 72/02 |
| 2019/0313279 | A1* | 10/2019 | Li | H04W 28/0289 |
| 2021/0144683 | A1* | 5/2021 | Zhao | H04W 72/082 |

FOREIGN PATENT DOCUMENTS

| | | | |
|---|---|---|---|
| CN | 104796986 | A | 7/2015 |
| CN | 104936294 | A | 9/2015 |
| EP | 2793520 | A1 | 10/2014 |
| KR | 20150053686 | A | 5/2015 |
| WO | 2015106684 | A1 | 7/2015 |
| WO | 2015177611 | A1 | 11/2015 |
| WO | 2016012654 | A1 | 1/2016 |

OTHER PUBLICATIONS

Extended European Search Report issued in European Application No. 16912271.0 dated Jun. 19, 2019, 9 pages.
Office Action issued in Chinese Application No. 201680087479.4 dated Mar. 24, 2020, 27 pages (With English Translation).
Office Action issued in Chinese Application No. 201910544123.4 dated Feb. 13, 2020, 14 pages (with English translation).
3GPP TS 36.212 V13.2.0 (Jun. 2016), 3rd Generation Partnership Project; Technical Specification Group Radio Access Network; Evolved Universal Terrestrial Radio Access (E-UTRA); Multiplexing and channel coding (Release 13), Jun. 2016, 140 pages.
3GPP TS 36.213 V13.2.0 (Jun. 2016), 3rd Generation Partnership Project; Technical Specification Group Radio Access Network; Evolved Universal Terrestrial Radio Access (E-UTRA);Physical layer procedures(Release 13), Jun. 2016, 381 pages.
3GPP TS 36.214 V13.2.0 (Jun. 2016), 3rd Generation Partnership Project;Technical Specification Group Radio Access Network; Evolved Universal Terrestrial Radio Access (E-UTRA); Physical layer; Measurements (Release 13), Jun. 2016, 19 pages.
3GPP TS 36.321 V13.2.0 (Jun. 2016), 3rd Generation Partnership Project;Technical Specification Group Radio Access Network; Evolved Universal Terrestrial Radio Access (E-UTRA); Medium Access Control (MAC) protocol specification (Release 13), Jun. 2016, 91 pages.
PCT International Search Report and Written Opinion issued in International Application No. PCT/CN2016/094703 dated May 31, 2017, 17 pages (with English translation).
Huawei, "Details of sensing based collision avoidance," 3GPP TSG-RAN WG1#84b R1-162641, Apr. 11, 2016, 8 pages.
Office Action issued in Japanese Application No. 2019/507,235 dated Jan. 21, 2020, 6 pages (with English translation).
Huawei et al., "Power control for V2V," 3GPP TSG RAN WG1 #84, R1-160735, St. Julian's, Malta, Feb. 15-19, 2016, 6 pages.
Office Action issued in Korean Application No. 2019-7006879 dated Jun. 30, 2020, 11 pages (with English translation).
EPO Communication pursuant to Article 94(3) EPC issued in European Application No. 16912271.0 dated Aug. 27, 2020, 5 pages.

* cited by examiner

RESOURCE ENERGY DETERMINING METHOD AND APPARATUS

CROSS-REFERENCE TO RELATED APPLICATIONS

This application is a continuation of International Application No. PCT/CN2016/094703, filed on Aug. 11, 2016, the disclosure of which is hereby incorporated by reference in its entirety.

TECHNICAL FIELD

The present invention relates to the field of vehicle to vehicle communications technologies, and in particular, to a resource energy determining method and apparatus.

BACKGROUND

As the living standards continuously improve, vehicles have been gradually integrated into people's daily life and become an essential transportation means. However, with emergence of the vehicles, an incidence of road traffic accidents is increasing year by year. A vehicle to vehicle (V2V) communications technology is a technology in which vehicles can periodically exchange status information with each other within an effective distance. By using the V2V communications technology, information such as a position, a speed, and a status of a vehicle may be sent to nearby vehicles, so that the nearby vehicles and drivers can accurately learn of information about road traffic safety and the like in time, and determine and make a warning for a potential danger, thereby reducing a traffic accident occurrence possibility.

Currently, during an exchange of status information in vehicle to vehicle communication, user equipment UE uses a sensing mechanism in an autonomous resource selection mode, and uses a semi-persistent transmission (SPT) mechanism. To be specific, the UE first decodes control information sent by another UE in a sensing window, measures energy of a demodulation reference signal of corresponding position data of the another UE, and excludes a data transmission resource whose energy value is greater than a threshold. Subsequently, the UE selects, in an energy sequence, a low-energy subset from data transmission resources that are not excluded, and selects a final data transmission resource from the low-energy subset.

However, in the process of selecting the data transmission resource, because of a limitation to half-duplex communication, the UE cannot measure a data transmission resource in a subframe in which data of the UE is sent. Therefore, in subsequent data transmission resource selection, it is considered by default that the subframe cannot be used. Consequently, some data transmission resources that could have been used cannot be used, reducing system resource utilization. In addition, because of reduction of available resource sets, more resource selection collisions may occur when a plurality of UEs perform resource selection based on a sensing result.

SUMMARY

Embodiments of the present invention provide a resource energy determining method and apparatus, to resolve prior-art problems that system resource utilization is reduced, and that a resource selection collision easily occurs.

To achieve the foregoing objective, the following technical solutions are used in the embodiments of the present invention:

According to a first aspect, a resource energy determining method is provided. The method includes: obtaining, by first UE, time-frequency resource indication information and resource cycle reservation information of second UE in a sensing time window of the first UE; determining, by the first UE, energy of a first resource based on the time-frequency resource indication information of the second UE; and determining, by the first UE, energy of at least one second resource based on the energy of the first resource and the resource cycle reservation information of the second UE, where a time-frequency domain location of the first resource in a transmission period in which the first resource is located is the same as a time-frequency domain location of each of the at least one second resource in a transmission period in which the second resource is located. In the foregoing technical solution, an available resource whose energy cannot be determined before can be selected and used by the UE, to improve system resource utilization. In addition, a possibility of a resource selection collision occurring when a plurality of UEs perform resource selection based on a sensing result can be reduced.

In a possible implementation, the obtaining, by first UE, time-frequency resource indication information of second UE in a sensing time window of the first UE includes: obtaining, by the first UE, the time-frequency resource indication information of the second UE from control information corresponding to initial data transmission or data retransmission of the second UE in the transmission period in which the first resource is located. To be specific, the time-frequency resource indication information of the second UE may be carried in the control information of the second UE, and the first UE may obtain the time-frequency resource indication information of the second UE by using the control information.

In a possible implementation, the first resource is a frequency domain resource in a subframe in which the first UE sends data in the sensing time window of the first UE, or the first resource is a frequency domain resource that the first UE cannot decode in a subframe in the sensing time window of the first UE.

In a possible implementation, the determining, by the first UE, energy of a first resource based on the time-frequency resource indication information of the second UE includes: determining, by the first UE, at least one third resource based on the time-frequency resource indication information of the second UE, where the second UE transmits same data on the at least one third resource and the first resource, and the same data is one piece of data, or is a plurality of redundancy versions of one piece of data; and determining, by the first UE, the energy of the first resource based on energy of the at least one third resource, where the energy of the at least one third resource is measured by the first UE. In the foregoing possible technical solution, the first UE may determine the energy of the first resource based on energy that is of the at least one third resource and that is measured when the second UE initially transmits or retransmits the same data.

In a possible implementation, the determining, by the first UE, the energy of the first resource based on energy of the at least one third resource includes: determining, by the first UE, an average value, a maximum value, or a minimum value of the energy of the at least one third resource as the energy of the first resource.

In a possible implementation, if there are a plurality of first resources, the plurality of first resources are corresponding to a plurality of second resources, the plurality of second resources are in at least one subframe, and at least two of the plurality of second resources are in a same subframe; and if frequency domain locations of the at least two second resources in the same subframe overlap, for energy at an overlapped frequency domain location, that the first UE determines the energy at the overlapped frequency domain location based on energy of first resources corresponding to the at least two second resources includes: determining, as the resource energy at the overlapped frequency domain location, energy at the overlapped frequency domain location of any first resource in the energy of the first resources corresponding to the at least two second resources; or performing addition or averaging on energy at the overlapped frequency domain location of the first resources corresponding to the at least two second resources, to obtain the energy at the overlapped frequency domain location.

In a possible implementation, if at least two of the plurality of first resources are in a same subframe, and frequency domain locations of the at least two first resources overlap, that the first UE determines energy at an overlapped frequency domain location of each of the at least two first resources includes: determining, by the first UE, a proportion of the overlapped frequency domain location to a frequency domain location of each first resource; and determining, by the first UE, the energy at the overlapped frequency domain location of each first resource based on the proportion of the overlapped frequency domain location to the frequency domain location of each first resource and corresponding energy of each first resource.

In a possible implementation, the obtaining, by first UE, resource cycle reservation information of second UE in a sensing time window of the first UE includes: obtaining, by the first UE, the resource cycle reservation information based on configuration information sent by a base station; or obtaining, by the first UE, the resource cycle reservation information based on preset configuration information; or determining, by the first UE, the resource cycle reservation information based on the control information corresponding to the initial data transmission or the data retransmission of the second UE, where the resource cycle reservation information includes a resource reservation cycle and a resource cycle reservation quantity. In the foregoing possible technical solution, the first UE may obtain the resource cycle reservation information of the second UE by using the configuration information sent by the base station, the preset configuration information, the control information corresponding to the second UE, or the like.

In a possible implementation, the resource reservation cycle includes a resource cycle unit, the resource reservation cycle is an integer multiple of the resource cycle unit, and a value of the resource cycle unit is configured by the base station by using the configuration information, or a value of the resource cycle unit is preconfigured. In the foregoing possible technical solution, the resource reservation cycle may be configured by using the resource cycle unit, and the resource reservation cycle may be an integer multiple of the resource cycle unit.

In a possible implementation, the resource reservation cycle is a fixed cycle, and/or the resource cycle reservation quantity is a fixed quantity. In a possible implementation, the configuration information can be configured by using system broadcast information or dedicated signaling of the base station.

According to a second aspect, a resource energy determining apparatus is provided. The apparatus includes: an obtaining unit, configured to obtain time-frequency resource indication information and resource cycle reservation information of second UE in a sensing time window of the resource energy determining apparatus; and a determining unit, configured to determine energy of a first resource based on the time-frequency resource indication information of the second UE, where the determining unit is further configured to determine energy of at least one second resource based on the energy of the first resource and the resource cycle reservation information of the second UE, where a time-frequency domain location of the first resource in a transmission period in which the first resource is located is the same as a time-frequency domain location of each of the at least one second resource in a transmission period in which the second resource is located. In the foregoing technical solution, an available resource whose energy cannot be determined before can be selected and used by the UE, to improve system resource utilization. In addition, a possibility of a resource selection collision occurring when resource selection is performed can be reduced.

In a possible implementation, the obtaining unit is specifically configured to: obtain the time-frequency resource indication information of the second UE from control information corresponding to initial data transmission or data retransmission of the second UE in the transmission period in which the first resource is located.

In a possible implementation, the first resource is a frequency domain resource in a subframe in which the resource energy determining apparatus sends data in the sensing time window of the resource energy determining apparatus, or the first resource is a frequency domain resource that the resource energy determining apparatus cannot decode in a subframe in the sensing time window of the resource energy determining apparatus.

In a possible implementation, the determining unit is specifically configured to: determine at least one third resource based on the time-frequency resource indication information of the second UE, where the second UE transmits same data on the at least one third resource and the first resource, and the same data is one piece of data, or is a plurality of redundancy versions of one piece of data; and determine the energy of the first resource based on energy of the at least one third resource, where the energy of the at least one third resource is measured by the resource energy determining apparatus.

In a possible implementation, the determining unit is further specifically configured to determine an average value, a maximum value, or a minimum value of the energy of the at least one third resource as the energy of the first resource.

In a possible implementation, if there are a plurality of first resources, the plurality of first resources are corresponding to a plurality of second resources, the plurality of second resources are in at least one subframe, and at least two of the plurality of second resources are in a same subframe; and if frequency domain locations of the at least two second resources in the same subframe overlap, for energy at an overlapped frequency domain location, the determining unit is further specifically configured to: determine, as the resource energy at the overlapped frequency domain location, energy at the overlapped frequency domain location of any first resource in energy of first resources corresponding to the at least two second resources; or perform addition or averaging on energy at the overlapped frequency domain location of the first resources corresponding to the at least two second resources, to obtain the energy at the overlapped frequency domain location.

In a possible implementation, if at least two of the plurality of first resources are in a same subframe, and frequency domain locations of the at least two first resources overlap, the determining unit is further specifically configured to: determine a proportion of the overlapped frequency domain location to a frequency domain location of each first resource; and determine energy at the overlapped frequency domain location of each first resource based on the proportion of the overlapped frequency domain location to the frequency domain location of each first resource and corresponding energy of each first resource.

In a possible implementation, the obtaining unit is further specifically configured to: obtain the resource cycle reservation information based on configuration information sent by a base station; or obtain the resource cycle reservation information based on preset configuration information; or determine the resource cycle reservation information based on the control information corresponding to the initial data transmission or the data retransmission of the second UE, where the resource cycle reservation information includes a resource reservation cycle and a resource cycle reservation quantity.

In a possible implementation, the resource reservation cycle includes a resource cycle unit, the resource reservation cycle is an integer multiple of the resource cycle unit, and a value of the resource cycle unit is configured by the base station by using the configuration information, or a value of the resource cycle unit is preconfigured.

In a possible implementation, the resource reservation cycle is a fixed cycle, and/or the resource cycle reservation quantity is a fixed quantity. In a possible implementation, the configuration information can be configured by using system broadcast information or dedicated signaling of the base station.

According to the resource energy determining method and apparatus provided in the embodiments of the present invention, the first UE obtains the time-frequency resource indication information and the resource cycle reservation information of the second UE in the sensing time window of the first UE, determines the energy of the first resource based on the time-frequency resource indication information of the second UE, and determines the energy of the at least one second resource based on the energy of the first resource and the resource cycle reservation information of the second UE, where the time-frequency domain location of the first resource in the transmission period in which the first resource is located is the same as the time-frequency domain location of each of the at least one second resource in the transmission period in which the second resource is located. This not only improves system resource utilization, but also reduces a possibility of a resource selection collision occurring when a plurality of UEs perform resource selection based on a sensing result.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
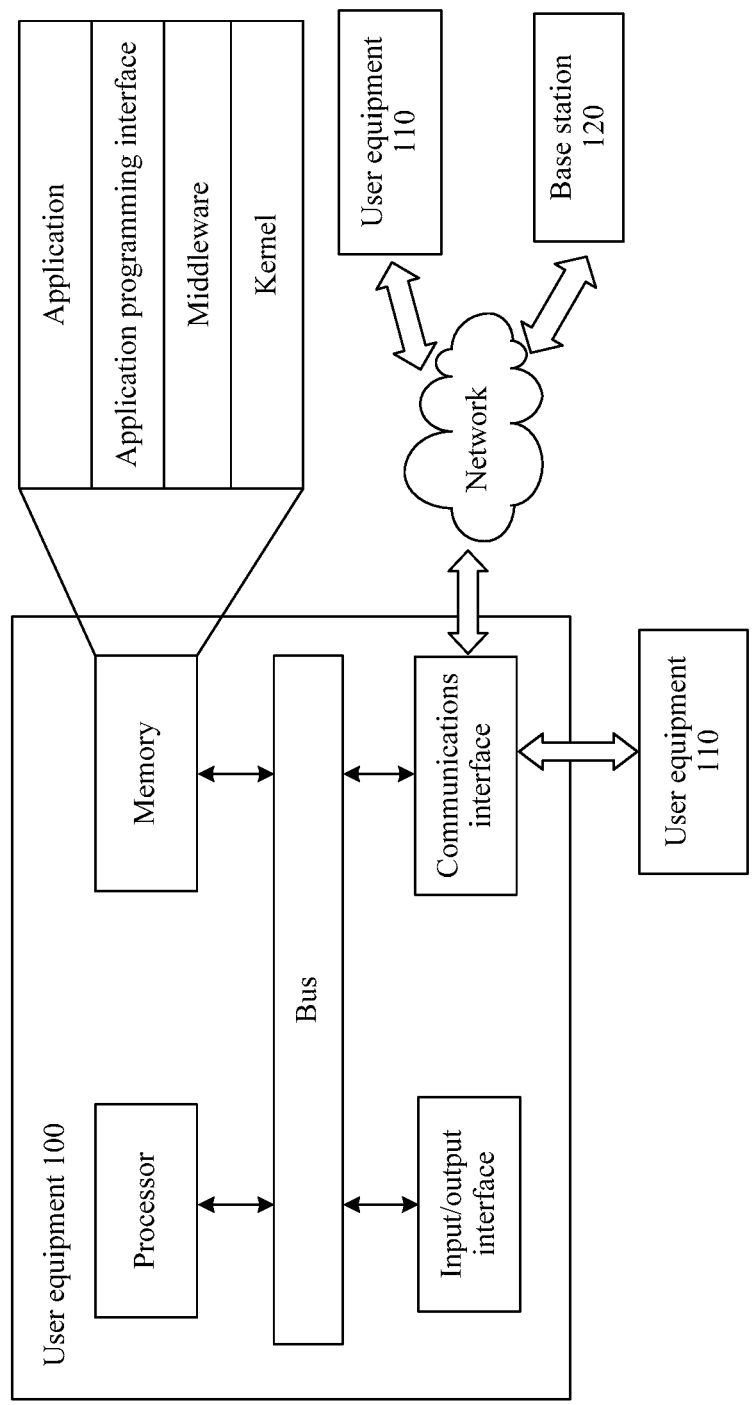
FIG. 1 is a schematic structural diagram of a vehicle to vehicle communications system according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

"Plurality" described in this specification means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Before the present invention is described, the technical terms in the present invention and the technical problems of the present invention are first briefly introduced.

Half-duplex communication indicates that each end of a communications channel may be a transmit end or a receive end. However, communication information can be transmitted in only one direction at one moment. The half-duplex communication is applicable to session communication between user equipments, for example, communication between walkie-talkies or interphones in daily life. A communication manner of user equipment (UE) in the present invention is the half-duplex communication.

A transmission period is a maximum tolerable time length for transmitting same data by the user equipment to another user equipment, and may be measured in ms. When the user equipment transmits same data, transmission of the same data may include a plurality of times of data retransmission. In this case, initial data transmission and data retransmission need to be completed in one transmission period. In other words, the user equipment may transmit same data for a plurality of times in one transmission period. For example, the transmission period for transmitting data by the user equipment may be 100 ms.

A sensing time window is a time window in which the user equipment measures energy of data sent by another user equipment. The sensing time window is a window that slides in real time as time elapses. A length of the sensing time window may include a plurality of transmission periods. If T represents a transmission period, the length of the sensing time window may be K×T, where K is a positive integer greater than or equal to 1. In other words, the sensing time window may be an integer multiple of T. For example, the sensing time window may be 1000 ms.

Currently, a vehicle to vehicle V2V communications technology based on Long Term Evolution (LTE) is being standardized in the 3rd Generation Partnership Project (3GPP). To ensure driving safety of vehicles, status information, namely, periodic status information (PSM) needs to be periodically exchanged between the vehicles. By analyzing PSMs of nearby vehicles, a vehicle or a driver may determine and make a warning for a potential danger, thereby reducing a road traffic accident occurrence possibility. A PSM service cycle may change with a motion status of a vehicle. Service cycles of UEs in different motion statuses may be valued in a range of [100 ms, 1000 ms]. Currently, the UE uses a sensing mechanism in an autonomous resource selection mode, and uses a semi-persistent transmission mechanism. To be specific, because the UE uses half-duplex communication, the UE cannot measure a data transmission resource of the UE while sending data. Therefore, in subsequent data transmission resource selection, it is considered by default that a subframe that is previously used by the UE for data transmission cannot be used. Consequently, a resource that has not been occupied or a reusable resource with relatively low energy that is occupied by another UE cannot be used. In this way, system resource utilization is reduced. In addition, because of reduction of available resource sets, more resource selection collisions may occur when a plurality of UEs perform resource selection based on a sensing result.

A basic principle of the present invention is: When UE selects a transmission resource, for some available resources whose energy cannot be determined by the UE in the prior art, the UE may obtain, in a sensing time window of the UE, time-frequency resource indication information and resource cycle reservation information for sending data by another UE. Then, the UE predicts, based on the time-frequency resource indication information and the resource cycle reservation information, resource energy that is of the available resources whose energy cannot be determined before and that is in a future transmission period, so that the resources can be selected and used by the UE. This not only improves system resource utilization, but also reduces a possibility of a resource selection collision occurring when a plurality of UEs perform resource selection based on a sensing result.

FIG. 1 is a schematic structural diagram of a vehicle to vehicle communications system according to an embodiment of the present invention. Referring to FIG. 1, the vehicle to vehicle communications system includes user equipment 100, other user equipments 110, and a base station 120. The user equipment 100 may include a bus, a processor, a memory, an input/output interface, and a communications interface.

The bus is used to connect circuits of the described elements and implement transmission between these elements. For example, the processor receives a command from another element by using the bus, decrypts the received command, and performs calculation or processes data based on the decrypted command.

The processor is a control center of the user equipment 100, connects all parts of the entire user equipment 100 by using various interfaces and cables, and executes various functions and data processing by running or executing a software program and/or a module stored in the memory and by invoking data stored in the memory, to perform overall monitoring on the user equipment 100. Optionally, the processor may include one or more processors. Preferably, an application processor and a modem processor may be integrated into the processor. The application processor mainly processes an operating system, a user interface, an application program, and the like. The modem processor mainly processes wireless communication.

The memory may include a program module, for example, a kernel, middleware, an application programming interface (API), and an application. The program module may include software, firmware, hardware, or at least two of the software, the firmware, or the hardware. The memory may mainly include a program storage area and a data storage area. The program storage area may store an operating system, an application program required by at least one function, and the like. The data storage area may store data created based on use of a mobile phone, and the like. In addition, the memory may include a high-speed random access memory, and may further include a nonvolatile memory, and the like.

The input/output interface provides an interface between the processor and a peripheral interface module, and forwards a command or data entered by a user by using the peripheral interface module. The peripheral interface module may be an inductor, a keyboard, a click wheel, a button, or the like. The button may include but is not limited to: a home button, a volume button, a start button, and a lock button.

The communications interface connects the user equipment to the other user equipments 110 and the base station 120. Optionally, the communications interface may include a radio frequency (RF) circuit. The RF circuit includes but is not limited to: an antenna, at least one amplifier, a transceiver, a coupler, a low noise amplifier (LNA), a duplexer, and the like. The communications interface may be connected to a network in a wired or wireless manner, to connect to the other user equipments 110 or the base station 120 outside, so that communication between the user equipment 100 and the other user equipments 110 and the base station 120 can be implemented by using the network. The wireless communication may use any communications standard or protocol, including but not limited to: Global System for Mobile Communications (GSM), a general packet radio service (GPRS), Code Division Multiple Access (CDMA), Wideband Code Division Multiple Access (WCDMA), Long Term Evolution LTE, Wireless Fidelity (Wi-Fi), Bluetooth, and the like. In an example embodiment, the communications interface receives a broadcast signal or broadcast-related information from an external broadcast management system by using a broadcast channel. In an example embodiment, the communications interface further includes a Wi-Fi module, a Bluetooth module, an infrared module, and the like, to facilitate short-range communication.

Although not shown in the figure, the user equipment 100 may further include a display device, a sensor module, an audio frequency module, and the like. Details are not described herein.

Persons skilled in the art may understand that the structure of the user equipment 100 shown in FIG. 1 does not constitute a limitation on the user equipment. Parts more or fewer than those shown in the figure may be included, some parts may be combined, or the parts may be arranged in different manners.

Figure 2:
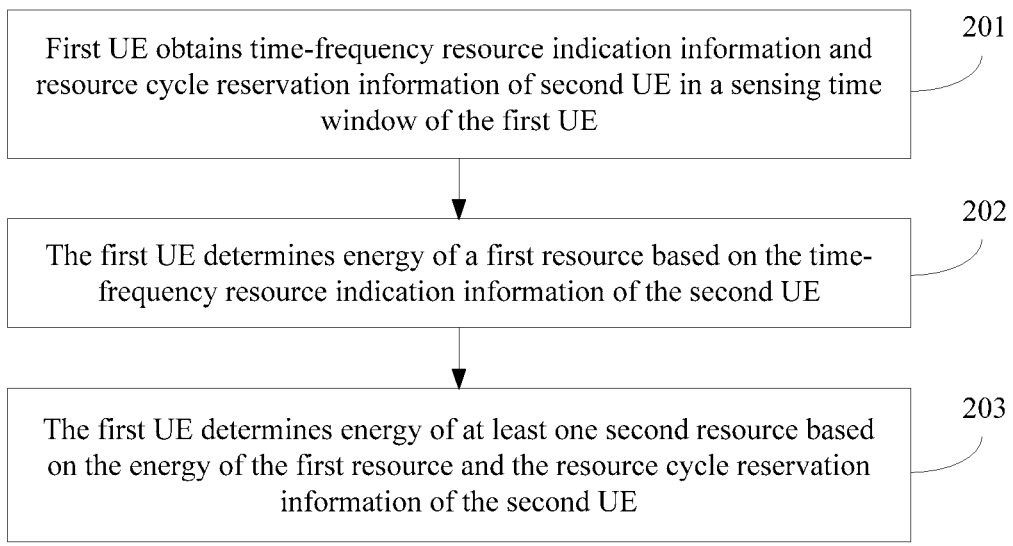
FIG. 2 is a schematic flowchart of a resource energy determining method according to an embodiment of the present invention.

FIG. 2 is a schematic structural diagram of a resource energy determining method according to an embodiment of the present invention. Referring to FIG. 2, the method includes the following several steps.

Step 201: First UE obtains time-frequency resource indication information and resource cycle reservation information of second UE in a sensing time window of the first UE.

The sensing time window is the sensing time window of the first UE. The first UE may obtain the time-frequency resource indication information and the resource cycle reservation information for transmitting data by the second UE in the sensing time window.

The time-frequency resource indication information is used to indicate a time-frequency resource on which the second UE transmits data in the sensing time window. The time-frequency resource includes a time domain resource and a frequency domain resource. The time domain resource may be a subframe in which the second UE transmits data in the sensing time window. The frequency domain resource may be a frequency band in which the second UE transmits data in the sensing time window. For the frequency band, one resource block (RB) may be used as a minimum occupation granularity, or several consecutive resource blocks may be used as a minimum occupation granularity.

Specifically, when the first UE obtains the time-frequency resource indication information of the second UE in the sensing time window of the first UE, the first UE may obtain the time-frequency resource indication information of the second UE from control information corresponding to initial data transmission or data retransmission of the second UE in a transmission period in which a first resource is located. The first resource may be a frequency domain resource in a subframe in which the first UE sends data in the sensing time window of the first UE, or the first resource may be a frequency domain resource that the first UE cannot decode in a subframe in the sensing time window of the first UE.

Two different cases may occur on the first resource. Therefore, the two different cases are separately described below.

Case 1: When the first resource is a frequency domain resource in a subframe in which the first UE sends data in the sensing time window of the first UE, as shown in FIG. 3, if the subframe in which the first UE transmits data overlaps a subframe in which the second UE transmits data, the first UE may detect control information corresponding to initial data transmission or data retransmission of the second UE in a transmission period in which the first resource is located, and decode the control information, to obtain the time-frequency resource indication information of the second UE.

Figure 3:
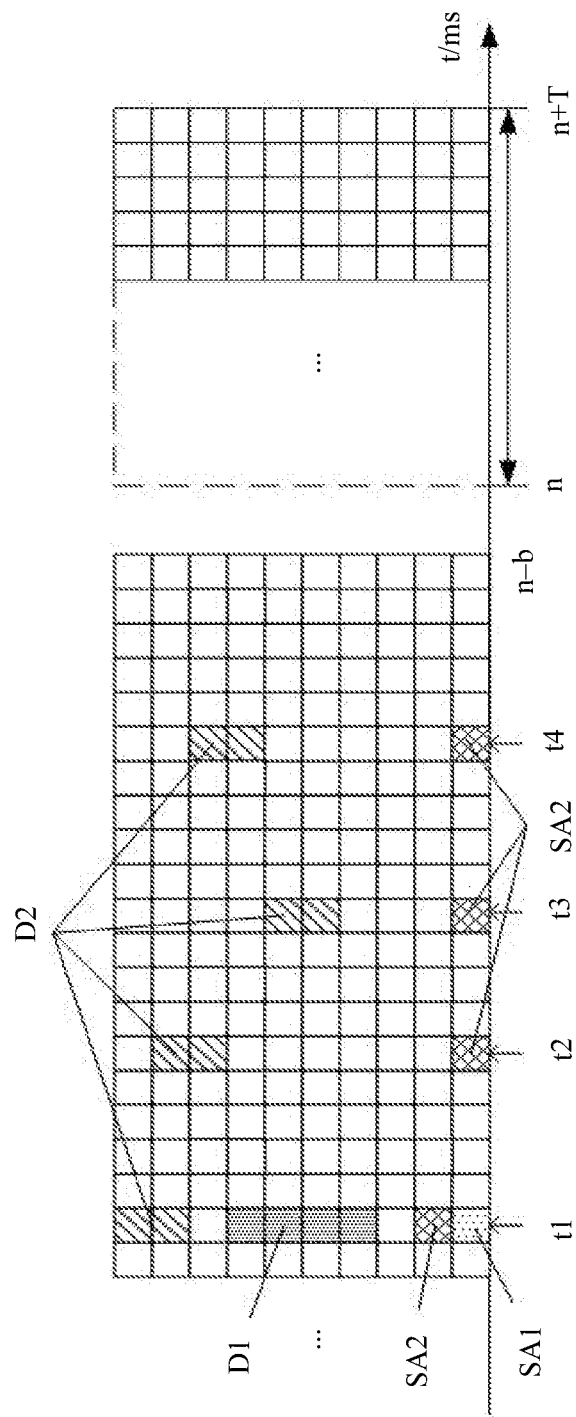
FIG. 3 is a schematic diagram of a first resource according to an embodiment of the present invention.

In FIG. 3, the first UE sends, in a subframe t1 in the sensing time window, control information SA1 and data information D1 corresponding to the control information SA1, and the second UE also sends, in the subframe t1, control information SA2 and data information D2 corresponding to the control information SA2. In addition, the second UE retransmits the D2 for a plurality of times, and retransmits the D2 for three times in subframes t2, t3, and t4. Further, the D2 retransmitted for three times may use a same redundancy version as or a different redundancy version from that used by the D2 sent in the subframe t1. Therefore, the first UE may detect and decode the SA2 transmitted by the second UE in the subframes t2, t3, and t4, to obtain the time-frequency resource indication information of the second UE.

Case 2: When the first resource is a frequency domain resource that cannot be decoded by the first UE in a subframe in the sensing time window of the first UE, as shown in FIG. 4, if the first UE cannot decode a frequency domain resource used by the second UE for data transmission, the first UE may detect control information corresponding to initial data transmission or data retransmission of the second UE in a transmission period in which the first resource is located, and decode the control information, to obtain the time-frequency resource indication information of the second UE, and further obtain the frequency domain resource used for data transmission.

Figure 4:
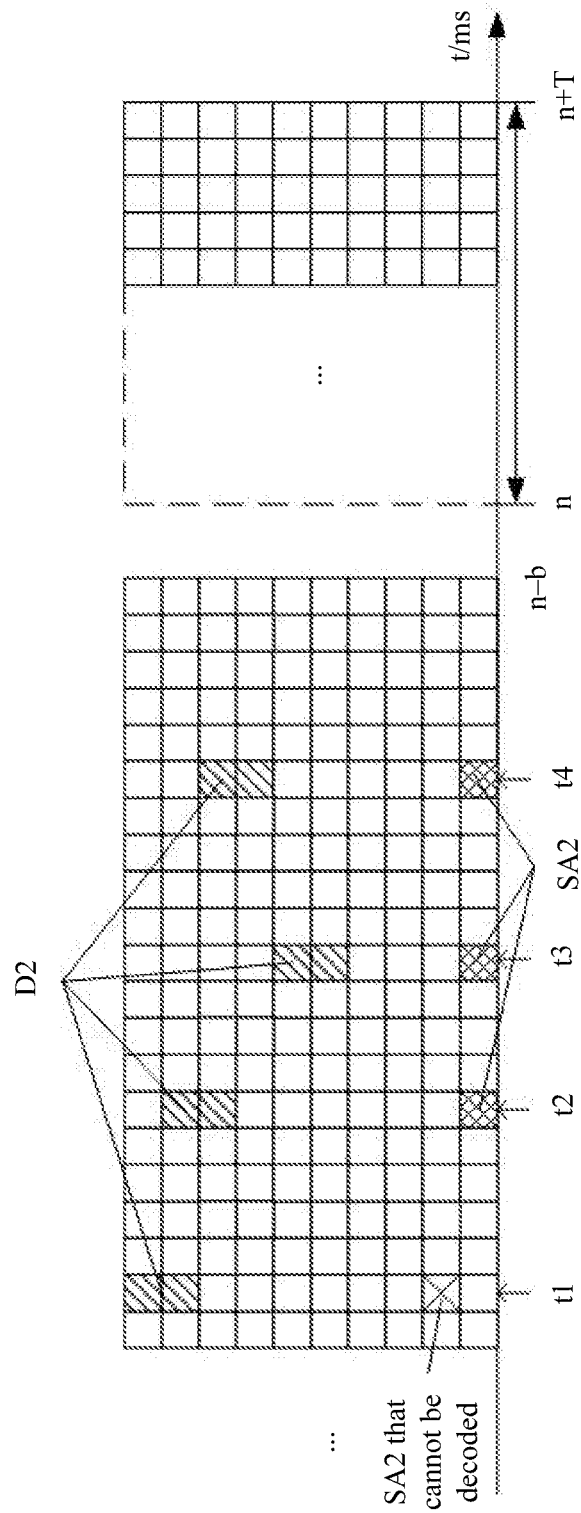
FIG. 4 is another schematic diagram of a first resource according to an embodiment of the present invention.

In FIG. 4, the first UE cannot decode the frequency domain resource used by the second UE for data transmission. In other words, the first UE cannot decode control information SA2 sent by the second UE in a subframe t1, and consequently cannot obtain a frequency domain resource of data information D2 corresponding to the control information. If the second UE retransmits the D2 for a plurality of times, the second UE retransmits the D2 for three times in subframes t2, t3, and t4, and the D2 retransmitted for three times may use a same redundancy version as or a different redundancy version from that used by the D2 sent in the subframe t1. Therefore, the first UE may detect and decode the SA2 transmitted by the second UE in the subframes t2, t3, and t4, to obtain the time-frequency resource indication information of the second UE, and further obtain a frequency domain resource that is used by the second UE for data transmission and that is corresponding to the control information in the subframe t1.

It should be noted that a subframe in which one UE sends control information may be the same as or different from a subframe in which the UE sends data corresponding to the control information. In addition, time-frequency resource indication information in control information corresponding to initial data transmission and data retransmission of the UE is the same. To be specific, the time-frequency resource indication information is used to indicate all time-frequency resources used by the UE for the initial data transmission and the data retransmission.

In addition, in FIG. 3 and FIG. 4, that the subframe in which the control information is sent is the same as the subframe in which the data corresponding to the control information is sent is merely an example, and the subframe in which the second UE sends data and a quantity of times of data retransmission performed by the second UE are also an example. FIG. 3 and FIG. 4 do not constitute a limitation to the present invention.

The resource cycle reservation information is resource cycle reservation information corresponding to a time-frequency resource indicated by the time-frequency resource indication information. The resource cycle reservation information may include a resource reservation cycle and a resource cycle reservation quantity.

Preferably, the resource reservation cycle is a fixed cycle, and/or the resource cycle reservation quantity is a fixed quantity. Certainly, in actual application, the resource reservation cycle and the resource cycle reservation quantity may change. This is not specifically limited in this embodiment of the present invention.

Specifically, when the first UE obtains the resource cycle reservation information of the second UE in the sensing time window of the first UE, the first UE may obtain the resource cycle reservation information of the second UE based on configuration information sent by a base station, or the first UE may obtain the resource cycle reservation information of the second UE based on preset configuration information, or the first UE may determine the resource cycle reservation information based on the control information corresponding to the initial data transmission or the data retransmission of the second UE.

Optionally, the resource reservation cycle includes a resource cycle unit, the resource reservation cycle is an integer multiple of the resource cycle unit, and a value of the resource cycle unit is configured by the base station by using the configuration information, or a value of the resource cycle unit is preconfigured. When the resource reservation cycle or the resource cycle unit is configured by the base station by using the configuration information, the configuration information can be configured by using system broadcast information or dedicated signaling of the base station.

It should be noted that the resource reservation cycle of the second UE may be determined by using a service cycle of the second UE. For example, when a service cycle of a service corresponding to the second UE is 200 ms, the resource reservation cycle may also be 200 ms.

Step 202: The first UE determines energy of a first resource based on the time-frequency resource indication information of the second UE.

Optionally, the first UE may determine at least one third resource based on the time-frequency resource indication information of the second UE, where the second UE transmits same data on the at least one third resource and the first resource, and the same data is one piece of data, or is a plurality of redundancy versions of one piece of data. The first UE determines the energy of the first resource based on energy of the at least one third resource, where the energy of the at least one third resource is measured by the first UE.

The time-frequency resource indication information of the second UE includes time-frequency resources for initially transmitting and retransmitting same data by the second UE. Therefore, if the first resource is a time-frequency resource for initially transmitting the same data by the second UE, the at least one third resource is a time-frequency resource for retransmitting the same data by the second UE. In addition, when retransmission of the same data includes a plurality of times of retransmission, the at least one third resource is a time-frequency resource corresponding to at least one of the plurality of times of retransmission. If the first resource is a time-frequency resource for retransmitting the same data by the second UE, and the first resource is a time-frequency resource corresponding to one of the plurality of times of retransmission, the at least one third resource may be a time-frequency resource corresponding to at least one of initial transmission or remaining retransmission of the same data.

For example, as shown in FIG. 3, if the first resource is a time-frequency resource for initially transmitting the D2 by the second UE in the subframe t1, the at least one third resource may be one or more of time-frequency resources for retransmitting the D2 by the second UE in the subframes t2, t3, and t4; or if the first resource is a time-frequency resource for retransmitting the D2 by the second UE in the subframe t2, the at least one third resource may be one or more of time-frequency resources for transmitting the D2 by the second UE in the subframes t1, t3, and t4.

In addition, the energy of the at least one third resource may be measured by the first UE before or after obtaining the time-frequency resource indication information of the second UE. This embodiment of the present invention imposes no specific limitation thereto.

Specifically, when the first UE determines the energy of the first resource based on the energy of the at least one third resource, the first UE may determine an average value, a maximum value, or a minimum value of the energy of the at least one third resource as the energy of the first resource.

Initial transmission and retransmission of the same data of the second UE that are shown in FIG. 3 are used as an example for description. If the first resource is a time-frequency resource corresponding to the D2 in the subframe t1, and the energy of the first resource is represented by Q1, and if the at least one third resource is time-frequency resources corresponding to the D2 in the subframes t2, t3, and t4, and corresponding resource energy is represented by Q2, Q3, and Q4 separately, Q1 is an average value of Q2, Q3, and Q4, or a maximum value or a minimum value of Q2, Q3, and Q4.

Step 203: The first UE determines energy of at least one second resource based on the energy of the first resource and the resource cycle reservation information of the second UE, where a time-frequency domain location of the first resource in a transmission period in which the first resource is located is the same as a time-frequency domain location of each of the at least one second resource in a transmission period in which the second resource is located.

The at least one second resource is one or more resources following the sensing time window of the first UE when resource reservation is performed for the first resource based on the resource cycle reservation information of the second UE. In addition, the time-frequency domain location of the first resource in the transmission period in which the first resource is located is the same as the time-frequency domain location of each second resource in the transmission period in which the second resource is located.

Figure 5:
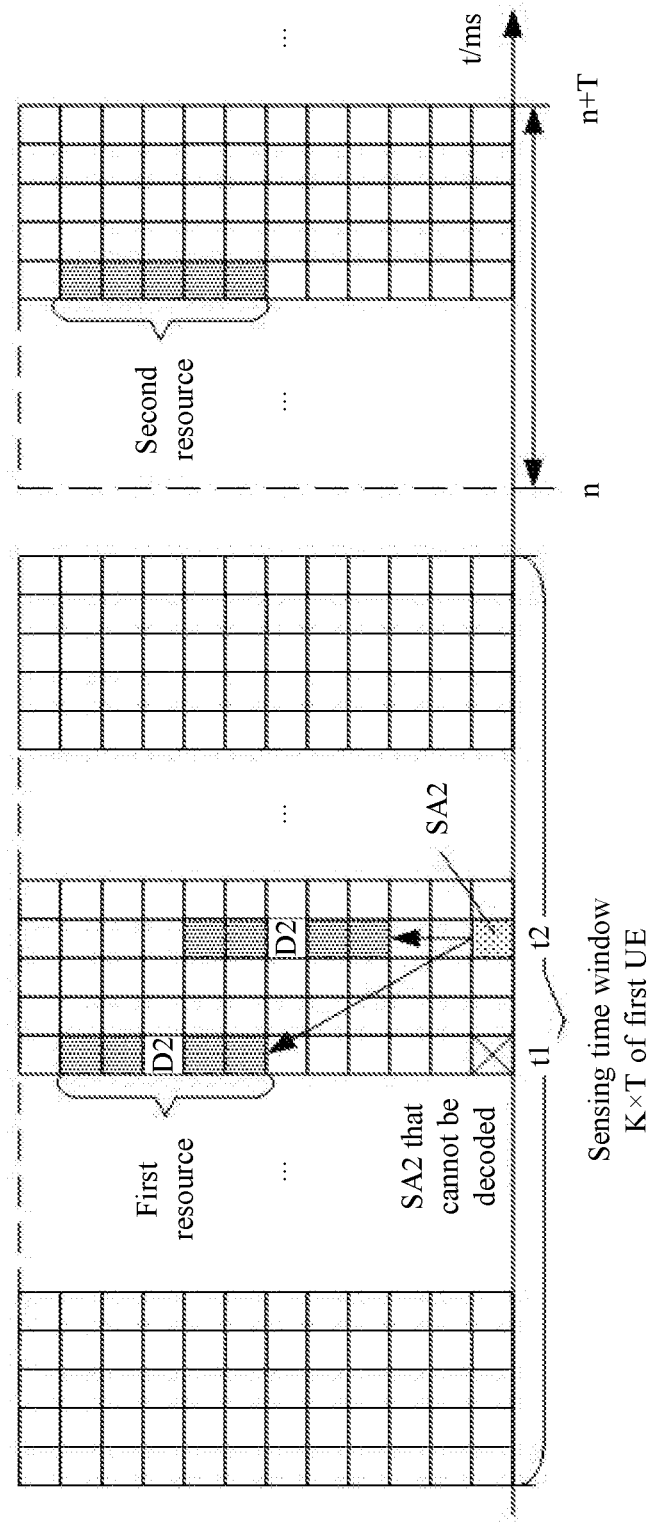
FIG. 5 is a schematic diagram of a first resource and a second resource according to an embodiment of the present invention.

For example, as shown in FIG. 5, a length of the sensing time window of the first UE is K×T, and the first resource is a resource on which the D2 in the subframe t1 is located in the sensing time window. When resource reservation is performed for the first resource based on the resource cycle reservation information of the second UE, one or more second resources following the sensing time window of the first UE are obtained, where a time-frequency domain location of each second resource in a transmission period in which the second resource is located is the same as a time-frequency domain location of the D2 in a transmission period in which the D2 is located.

When determining the energy of the at least one second resource based on the energy of the first resource and the resource cycle reservation information of the second UE, as shown in FIG. 5, the first UE may directly determine the energy of the first resource as energy of each second resource. In other words, the energy of each second resource is equal to the energy of the first resource.

Further, if there are a plurality of first resources, when resource reservation is performed based on UE resource cycle reservation information corresponding to each first resource, the plurality of first resources are corresponding to a plurality of second resources, and the plurality of second resources are in at least one subframe. That the plurality of second resources are in at least one subframe indicates that the plurality of second resources may be in one subframe, or in a plurality of subframes. In other words, the plurality of second resources may be in one subframe, or in different subframes.

There are a plurality of different cases for subframes in which the plurality of second resources are located. Therefore, in the different cases, there are different methods for determining, by the first UE, energy of the plurality of second resources based on energy of the plurality of first resources. The different cases for the subframes in which the plurality of second resources are located are separately described below.

Case I: When any two of the plurality of second resources are located in different subframes, or when at least two of the plurality of second resources are located in a same subframe and the at least two second resources do not overlap in frequency domain, a method for determining energy of each second resource is consistent with the foregoing method in which there is one first resource. In other words, for a second resource corresponding to each first resource, energy of the first resource may be directly determined as energy of the corresponding second resource.

Figure 6:
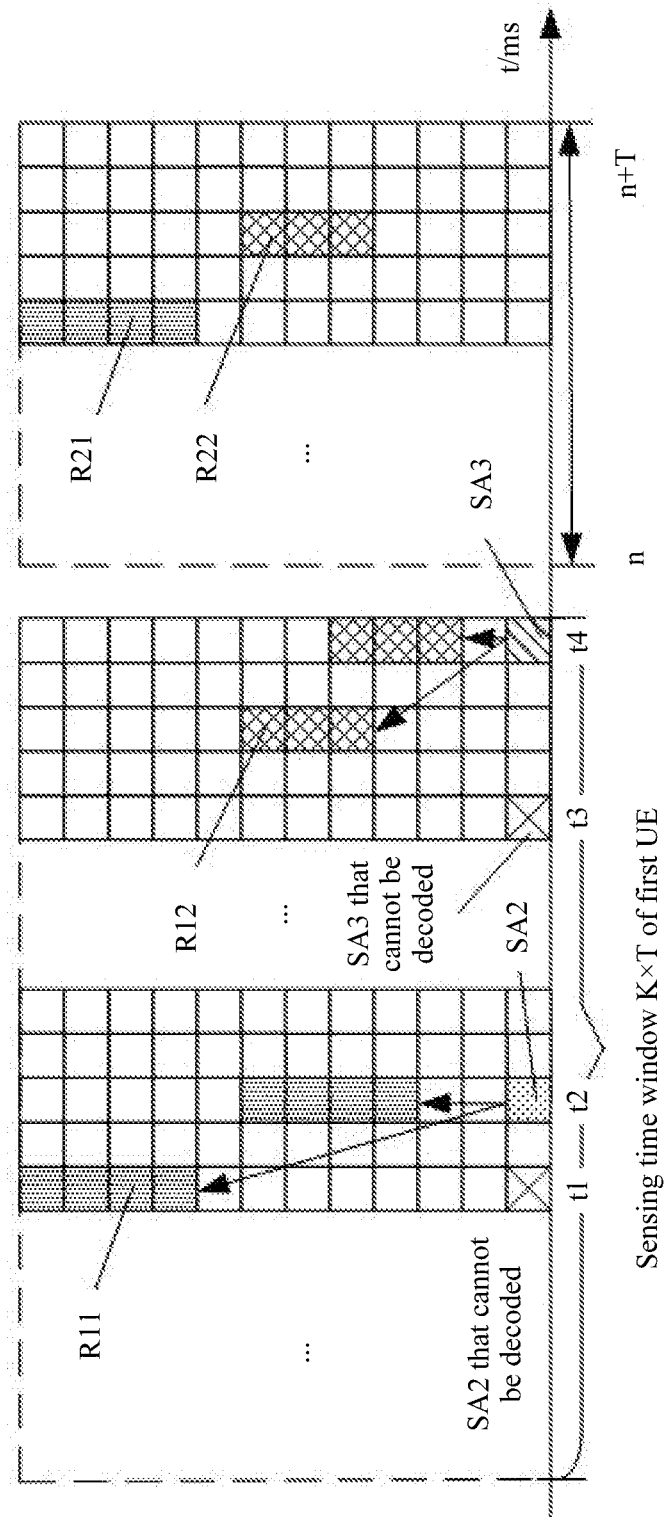
FIG. 6 is a first schematic diagram of a first resource and a second resource according to an embodiment of the present invention.

For example, there are two first resources R11 and R12, the first resource R11 is corresponding to a second resource R21, and the first resource R12 is corresponding to a second resource R22. As shown in FIG. 6, when the second resources R21 and R22 are located in different subframes, or as shown in FIG. 7, when the second resources R21 and R22 are located in a same subframe, and do not overlap in frequency domain, energy of the first resource R11 may be directly determined as energy of the second resource R21, and energy of the first resource R12 may be directly determined as energy of the second resource R22.

Figure 7:
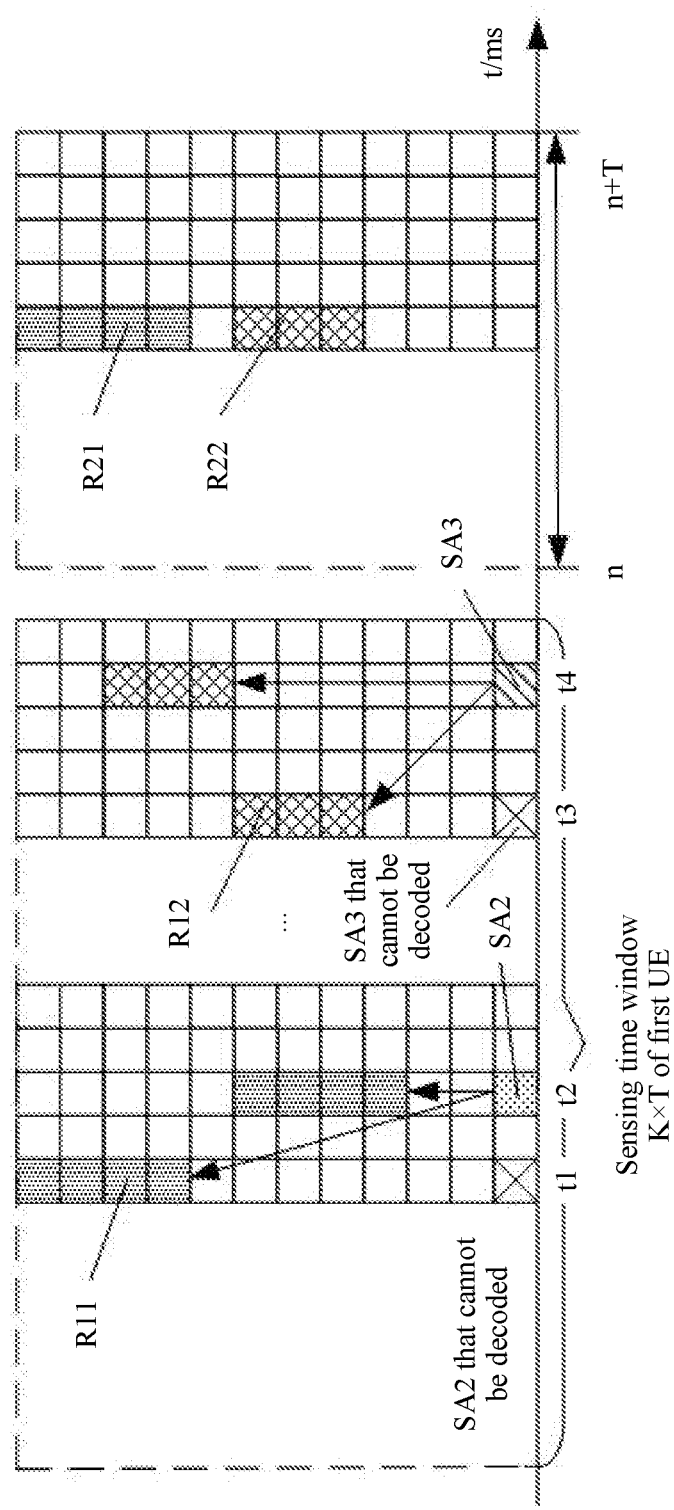
FIG. 7 is a second schematic diagram of a first resource and a second resource according to an embodiment of the present invention.

It should be noted that the first resources R11 and R12 in FIG. 6 and FIG. 7 may be resources for transmitting data by one UE in different transmission periods, or resources for transmitting data by different UEs in different transmission periods. In other words, control information SA2 and control information SA3 in FIG. 6 and FIG. 7 may belong to one UE or different UEs.

Case II: When at least two of the plurality of second resources are located in a same subframe, and frequency domain locations of the at least two second resources in the same subframe overlap, for energy at an overlapped frequency domain location, that the first UE determines the energy at the overlapped frequency domain location based on energy of first resources corresponding to the at least two second resources includes: determining, as the resource energy at the overlapped frequency domain location, energy at the overlapped frequency domain location of any first resource in the energy of the first resources corresponding to the at least two second resources; or performing addition or averaging on energy at the overlapped frequency domain location of the first resources corresponding to the at least two second resources, to obtain the energy at the overlapped frequency domain location.

In case II, there may be three different scenarios in which the energy at the overlapped frequency domain location is determined. The three different scenarios and specific processes of determining the energy at the overlapped frequency domain location in the scenarios are separately described below.

Scenario 1: There are initial data transmission and data retransmission of a plurality of UEs in the sensing time window of the first UE, and subframes in which the first UE and the plurality of UEs separately transmit data in different transmission periods in the sensing time window overlap, where the plurality of UEs are corresponding to different service cycles.

Figure 8:
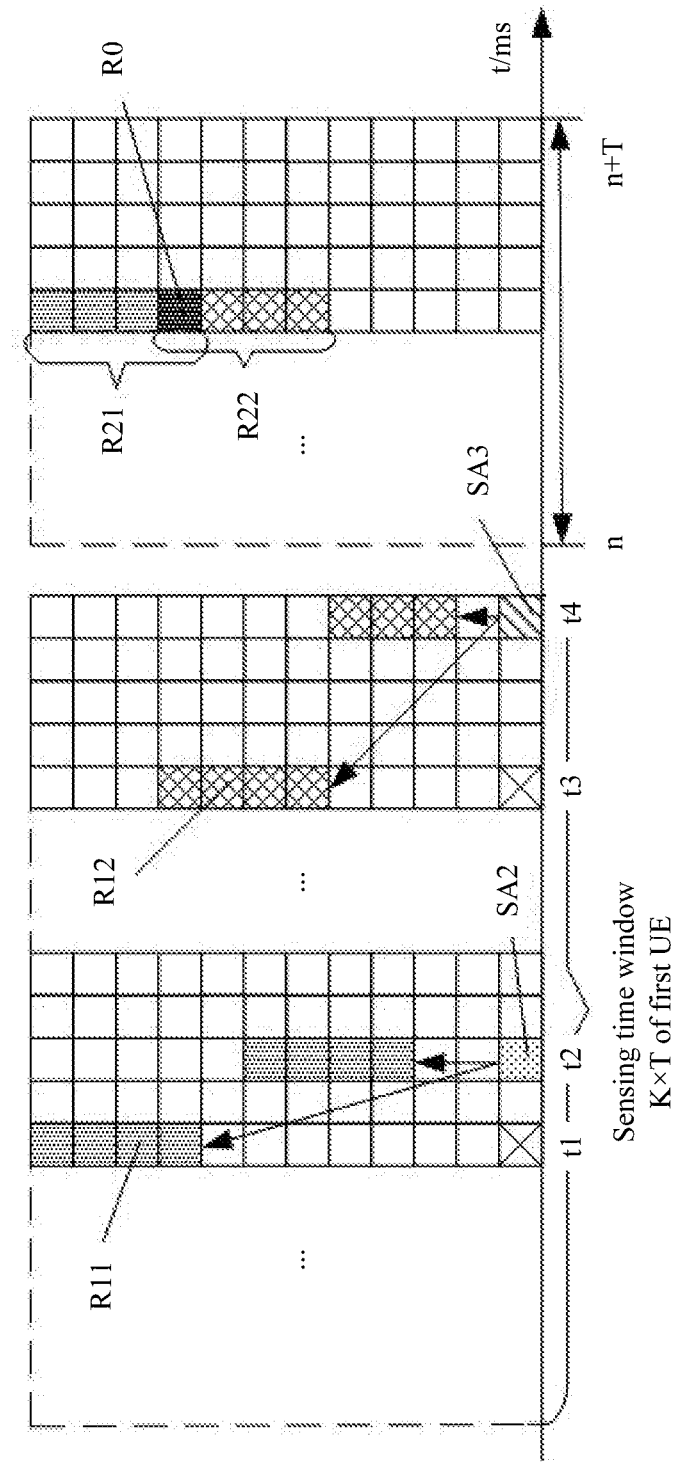
FIG. 8 is a third schematic diagram of a first resource and a second resource according to an embodiment of the present invention.

For example, as shown in FIG. 8, the plurality of UEs are UE 1 and UE 2. A resource reservation cycle of the UE 1 is 200 ms, and a resource reservation cycle of the UE 2 is 600 ms. A subframe in which the first UE sends data in the sensing time window of the first UE separately overlaps subframes in which the UE 1 and the UE 2 transmit data in two different transmission periods. To be specific, because of half-duplex communication, the first UE cannot measure energy of a resource on which the first UE transmits data. Therefore, energy of two first resources, namely, energy of R11 and R12, is determined based on step 201 and step 202. When reservation is performed based on the resource reservation cycle and a resource cycle reservation quantity of the UE 1 and the resource reservation cycle and a resource cycle reservation quantity of the UE 2, the first resource R11 is corresponding to a second resource R21, and the first resource R12 is corresponding to a second resource R22. The two second resources R21 and R22 are located in a same subframe, and frequency domain locations of the second resources R21 and R22 overlap. To be specific, an overlapped frequency domain location is a part represented by RO in FIG. 8.

In scenario 1, a method for determining energy at an overlapped frequency domain location may specifically include:

When no resource collision resolution mechanism exists in a system, or when a resource collision resolution mechanism exists in the system, but no collision resolution needs to be performed for the resource overlapping, a plurality of UEs transmit data on an overlapped resource. Therefore, energy at an overlapped frequency domain location is addition of energy at the overlapped frequency domain location of first resources corresponding to at least two second resources. For example, as shown in FIG. 8, the UE 1 and the UE 2 simultaneously transmit data on the overlapped resource RO. Therefore, energy at the overlapped frequency domain location RO is addition of energy at the overlapped frequency domain location of the two first resources.

When a resource collision resolution mechanism exists in the system, and only one UE performs transmission on an overlapped resource through resource collision resolution, energy of the overlapped resource may be energy at an overlapped frequency domain location of either of first resources corresponding to two second resources. Further, if the first UE can learn of all resource collision resolution results, to be specific, the first UE knows whether resource collision resolution succeeds, and that specific UE of a plurality of UEs monopolizes the resource after the resource collision resolution succeeds, it may be determined that the energy at the overlapped frequency domain location is energy at the overlapped frequency domain location of a first resource corresponding to the UE that monopolizes the resource.

When a resource collision resolution mechanism exists in the system, and only one UE performs transmission on an overlapped resource through resource collision resolution, energy of the overlapped resource may be an average value, a minimum value, or a maximum value of energy at an overlapped frequency domain location of first resources corresponding to at least two second resources. Further, if the first UE can learn of some resource collision resolution results, to be specific, if the first UE knows whether resource collision resolution succeeds, the energy of the overlapped resource may be determined based on the average value, the minimum value, or the maximum value of energy at the overlapped frequency domain location of the first resources corresponding to the at least two second resources corresponding to the results.

Scenario 2: There are initial data transmission and data retransmission of a plurality of UEs in the sensing time window of the first UE, and subframes in which the first UE and the plurality of UEs separately transmit data in different transmission periods in the sensing time window overlap, where the plurality of UEs are corresponding to a same service cycle.

Figure 9:
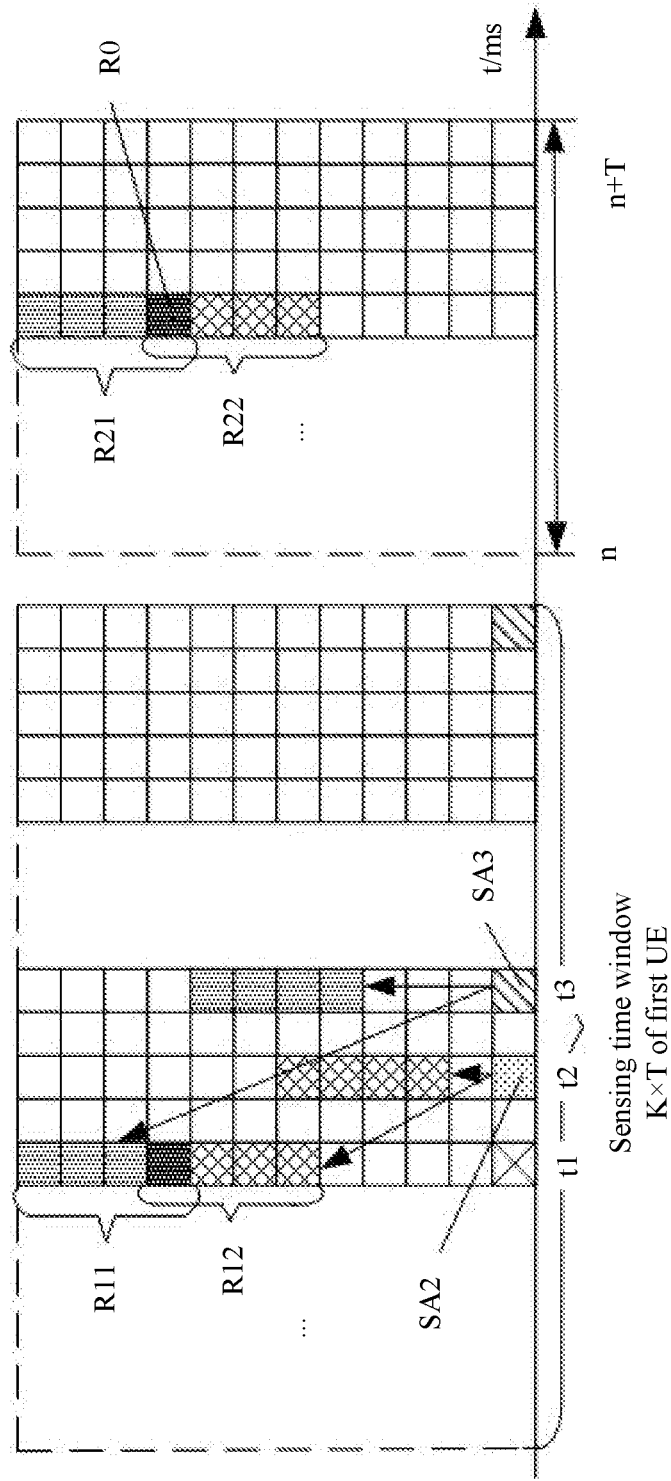
FIG. 9 is a fourth schematic diagram of a first resource and a second resource according to an embodiment of the present invention.

For example, as shown in FIG. 9, the plurality of UEs are UE 1 and UE 2, and service cycles of both the UE 1 and the UE 2 are 200 ms. A subframe in which the first UE sends data in the sensing time window of the first UE separately overlaps subframes in which the UE 1 and the UE 2 transmit data in two different transmission periods. To be specific, because of half-duplex communication, the first UE cannot measure energy of a resource on which the first UE transmits data. Therefore, energy of two first resources, namely, energy of R11 and R12, is determined based on step 201 and step 202. When reservation is performed based on a resource reservation cycle and a resource cycle reservation quantity of the UE 1 and a resource reservation cycle and a resource cycle reservation quantity of the UE 2, the first resource R11 is corresponding to a second resource R21, and the first resource R12 is corresponding to a second resource R22. The two second resources R21 and R22 are located in a same subframe, and frequency domain locations of the second resources R21 and R22 overlap. To be specific, an overlapped frequency domain location is a part represented by RO in FIG. 9.

In scenario 2, a method for determining energy at an overlapped frequency domain location may specifically include:

When no resource collision resolution mechanism exists in a system, or when a resource collision resolution mechanism exists in a system, but no collision resolution needs to be performed for the resource overlapping, energy at an overlapped frequency domain location is an average value, a maximum value, or a minimum value of energy at the overlapped frequency domain location of first resources corresponding to at least two second resources.

When a resource collision resolution mechanism exists in the system, and only one UE performs transmission on an overlapped resource through resource collision resolution, because energy that is of a first resource and that is measured by the first UE is addition of energy for sending data by a plurality of UEs. Therefore, energy at an overlapped frequency domain location may be determined by using a minimum value of energy at the overlapped frequency domain location of first resources corresponding to at least two second resources.

Figure 10:
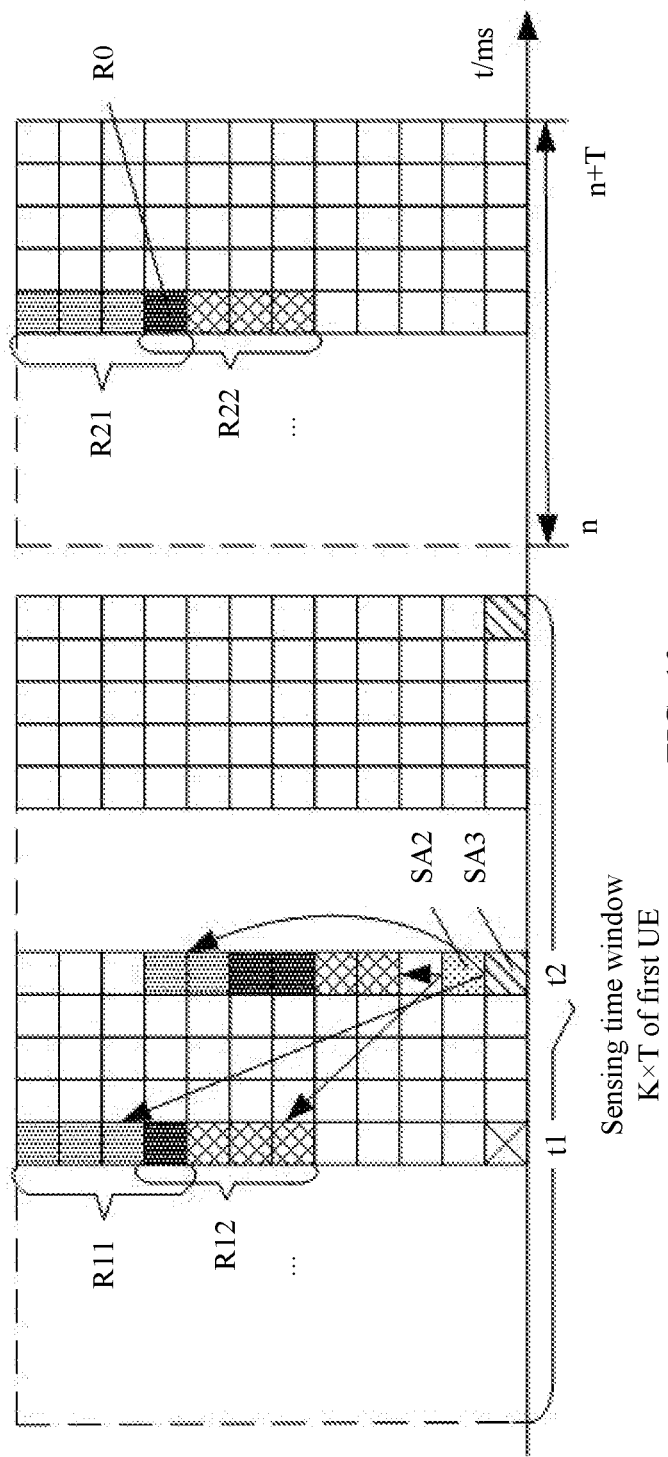
FIG. 10 is a fifth schematic diagram of a first resource and a second resource according to an embodiment of the present invention.

Further, when energy of a first resource of UE is determined in the sensing time window based on energy of at least one third resource of the UE of a plurality of UEs, if frequency domain locations of at least one third resource corresponding to different UEs overlap, for example, as shown in FIG. 10, if a frequency domain location of at least one third resource that is in the subframe t2 and that corresponds to UE 1 overlaps a frequency domain location of at least one third resource that is in the subframe t2 and that corresponds to UE 2, when energy measured by the first UE at an overlapped frequency domain location at the moment t2 is energy as a whole, energy at an overlapped frequency domain location at the moment t1 may be determined based on a proportion of a frequency domain of the overlapped frequency domain location at the moment t1 to a frequency domain of the overlapped frequency domain location at the moment t2. As shown in FIG. 10, the resource energy at the overlapped frequency domain location at the moment t1 is obtained by dividing, by 2, the energy measured at the overlapped frequency domain location at the moment t2.

Further, in scenario 1 and scenario 2, to be specific, in scenarios in which there are a plurality of UEs, if at least two of a plurality of first resources are in a same subframe, and frequency domain locations of the at least two first resources overlap, that the first UE determines energy at an overlapped frequency domain location of each of the at least two first resources includes: determining, by the first UE, a proportion of the overlapped frequency domain location to a frequency domain location of each first resource; and determining, by the first UE, the energy at the overlapped frequency domain location of each first resource based on the proportion of the overlapped frequency domain location to the frequency domain location of each first resource and corresponding energy of each first resource.

For example, as shown in FIG. 9, frequency domain locations of the first resource R11 and the first resource R12 overlap at the moment t1. A method for determining, by the first UE, energy at an overlapped frequency domain location of the first resource R11 may include: The first UE determines that a proportion of the overlapped frequency domain location of the first resource R11 to the frequency domain location of the first resource R11 is ¼, and the first UE multiplies energy of the first resource R11 by the proportion ¼, to obtain the energy at the overlapped frequency domain location of the first resource R11 at the moment t1. Likewise, the first UE determines that a proportion of an overlapped frequency domain location of the first resource R12 to the frequency domain location of the first resource R12 is ¼, and the first UE multiplies energy of the first resource R12 by the proportion ¼, to obtain the energy at the overlapped frequency domain location of the first resource R12 at the moment t1.

Scenario 3: There are initial data transmission and data retransmission of single UE in the sensing time window of the first UE, and subframes in which the first UE and the single UE transmit data in different transmission periods in the sensing time window overlap.

For example, the single UE is UE 1, and a service cycle of the UE 1 is 100 ms. Subframes in which the first UE and the UE 1 transmit data in two different transmission periods in the sensing time window of the first UE overlap. In addition, energy of two first resources is determined based on step 201 and step 202. The two first resources are corresponding to two second resources, the two second resources are located in a same subframe, and frequency domain locations of the two second resources overlap.

In scenario 2, the method for determining energy at an overlapped frequency domain location may specifically include: the energy at the overlapped frequency domain location may be an average value, a minimum value, or a maximum value of energy at the overlapped frequency domain location of first resources corresponding to at least two second resources.

It should be noted that in case II, when at least two of the plurality of second resources are located in a same subframe, and frequency domain locations of the at least two second resources in the same subframe overlap, the overlapping may include partial overlapping and complete overlapping of a frequency domain location. When the overlapping is partial overlapping, a method for determining energy of a non-overlapped frequency domain location is consistent with the determining method in case I. For details, refer to the description in case I. Details are not described herein in this embodiment of the present invention.

According to the resource energy determining method provided in this embodiment of the present invention, the first UE obtains the time-frequency resource indication information and the resource cycle reservation information of the second UE in the sensing time window of the first UE, determines the energy of the first resource based on the time-frequency resource indication information of the second UE, and determines the energy of the at least one second resource based on the energy of the first resource and the resource cycle reservation information of the second UE, where the time-frequency domain location of the first resource in the transmission period in which the first resource is located is the same as the time-frequency domain location of each of the at least one second resource in the transmission period in which the second resource is located. This not only improves system resource utilization, but also reduces a possibility of a resource selection collision occurring when a plurality of UEs perform resource selection based on a sensing result.

The foregoing mainly describes the solutions provided in the embodiments of the present invention from a perspective of interaction between network elements. It may be understood that to achieve the foregoing functions, each network element, such as the first UE, the second UE, or the base station, includes a corresponding hardware structure and/or software module for implementing each function. Persons skilled in the art should be easily aware that with reference to the examples described in the embodiments disclosed in this specification, the network elements and algorithm steps may be implemented in a form of hardware or in a form of a combination of hardware and computer software in the present invention. Whether a function is executed by hardware or hardware driven by computer software depends on particular applications and design constraint conditions of the technical solutions. Persons skilled in the art may use different methods to implement the described functions for each particular application, but it should not be considered that the implementation goes beyond the scope of the present invention.

In the embodiments of the present invention, function module division may be performed on the first UE, the second UE, and the base station based on the foregoing method example. For example, each function module may be obtained through division based on each corresponding function, or two or more functions may be integrated into one processing module. The integrated module may be implemented in a form of hardware, or may be implemented in a form of a software function module. It should be noted that the module division in the embodiments of the present invention is an example, and is merely logical function division and there may be another division manner in an actual implementation.

Figure 11:
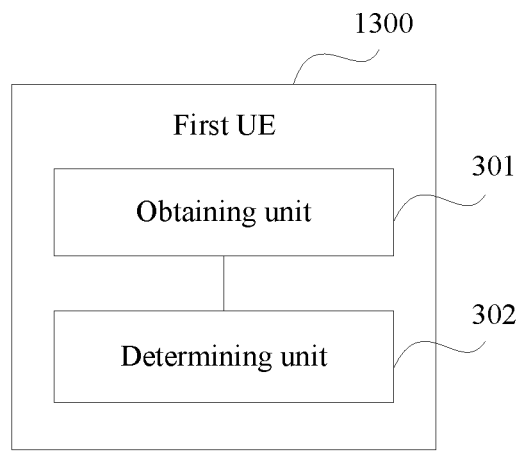
FIG. 11 is a schematic structural diagram of first UE according to an embodiment of the present invention.

When each function module is obtained through division based on each corresponding function, FIG. 11 is a possible schematic structural diagram of the first UE in the foregoing embodiment. The first UE 300 includes an obtaining unit 301 and a determining unit 302. The obtaining unit 301 is configured to perform, by the first UE, the process 201 in FIG. 2. The determining unit 302 is configured to support the first UE in performing the processes 202 and 203 in FIG. 2. All related content of each step in the foregoing method embodiment may be cited in function descriptions of a corresponding function module. Details are not described herein.

Figure 12:
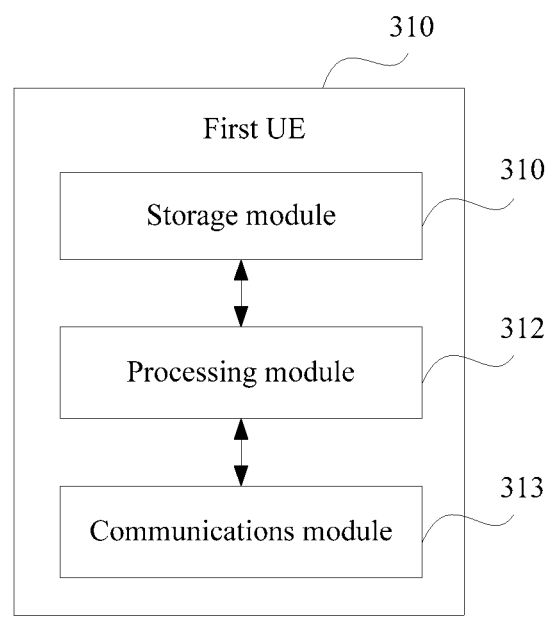
FIG. 12 is another schematic structural diagram of first UE according to an embodiment of the present invention.

When an integrated unit is used, FIG. 12 is a possible schematic structural diagram of the first UE in the foregoing embodiment. The first UE 310 includes a processing module 312 and a communications module 313. The processing module 312 is configured to control and manage an action of the first UE. For example, the processing module 312 is configured to support the first UE in performing the processes 201, 202, and 203 in FIG. 2, and/or configured to perform another process of the technology described in this specification. The communications module 313 is configured to support communication between the first UE and another network entity. For example, the communications module 313 is configured to support communication between the first UE and the second UE, the base station, and the like. The first UE may further include a storage module 311, configured to store program code and data of the first UE.

The processing module 312 may be a processor or a controller, such as a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 312 may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 313 may be a transceiver, a transceiver circuit, a communications interface, or the like. The storage module 311 may be a memory.

When the processing module 312 is a processor, the communications module 313 is a communications interface. When the storage module 311 is a memory, the first UE in this embodiment of the present invention may be first UE shown in FIG. 13.

Figure 13:
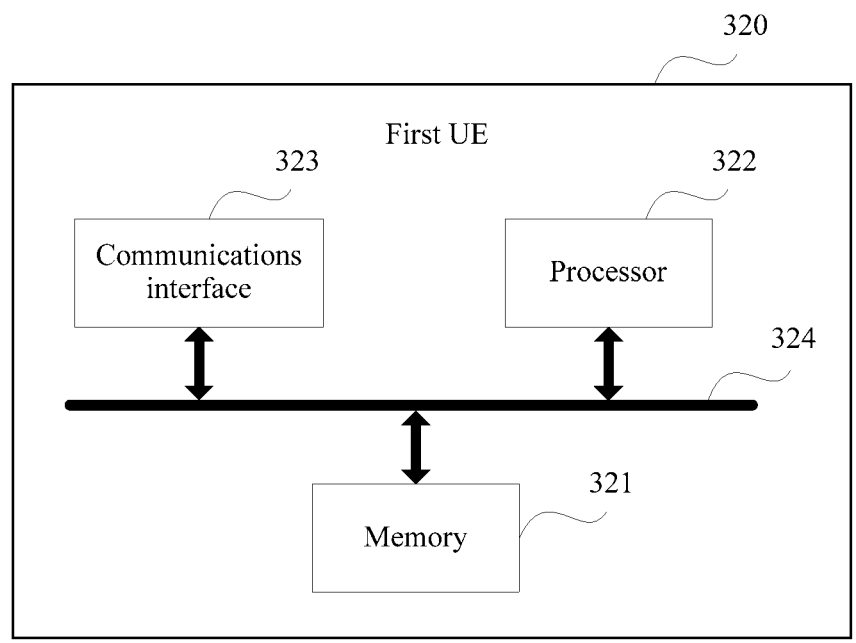
FIG. 13 is still another schematic structural diagram of first UE according to an embodiment of the present invention.

Referring to FIG. 13, the first UE 320 includes a processor 322, a communications interface 323, a memory 321, and a bus 324. The communications interface 323, the processor 322, and the memory 321 are interconnected by using the bus 324. The bus 324 may be a peripheral component interconnect (PCI) bus, an extended industry standard architecture (EISA) bus, or the like. The bus may be classified into an address bus, a data bus, a control bus, and the like. For ease of representation, only one bold line is used in FIG. 13 to represent the bus 324, but it does not indicate that there is only one bus or one type of bus.

Figure 14:
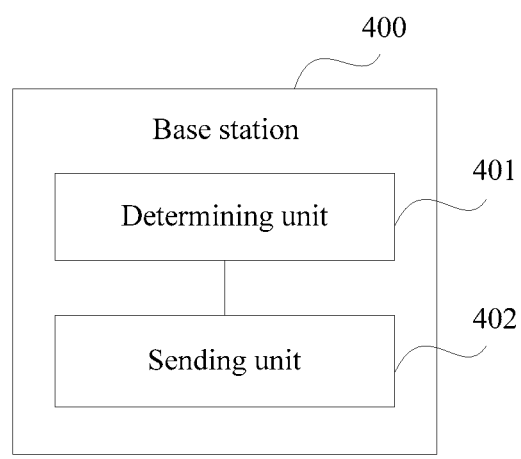
FIG. 14 is a schematic structural diagram of a base station according to an embodiment of the present invention.

When each function module is obtained through division based on each corresponding function, FIG. 14 is a possible schematic structural diagram of the base station in the foregoing embodiment. The base station 400 includes a determining unit 401 and a sending unit 402. The determining unit 401 is configured to perform, by the base station, a process of determining the configuration information in the embodiment described in FIG. 2, to be specific, a process of determining the resource cycle reservation information, including a process of determining the resource reservation cycle, the resource cycle reservation quantity, or the resource cycle unit; and/or configured to perform another process of the technology described in this specification. The sending unit 402 is configured to support the base station in performing a process of sending the configuration information to the first UE in the embodiment described in FIG. 2. All related content of each step in the foregoing method embodiment may be cited in function descriptions of a corresponding function module. Details are not described herein.

Figure 15:
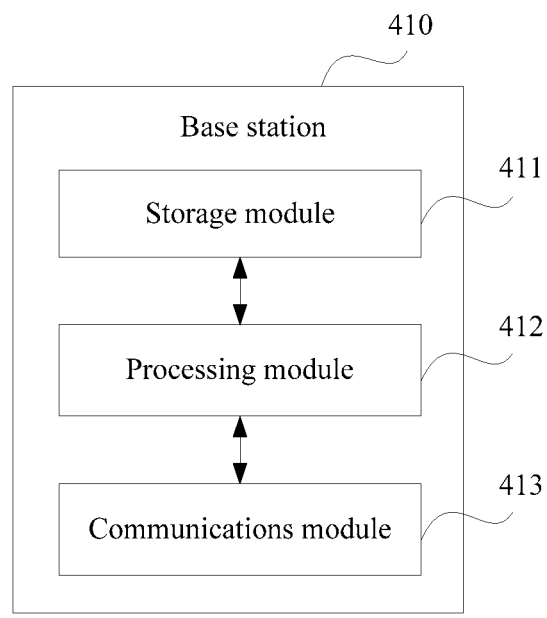
FIG. 15 is another schematic structural diagram of a base station according to an embodiment of the present invention.

When an integrated unit is used, FIG. 15 is a possible schematic structural diagram of the base station in the foregoing embodiment. The base station 410 includes a processing module 412 and a communications module 413. The processing module 412 is configured to control and manage an action of the base station. For example, the processing module 412 is configured to perform, by the base station, a process of determining the configuration information in the embodiment described in FIG. 2, to be specific, a process of determining the resource cycle reservation information, including a process of determining the resource reservation cycle, the resource cycle reservation quantity, or the resource cycle unit; and/or configured to perform another process of the technology described in this specification. The communications module 413 is configured to support communication between the base station and another network entity. For example, the communications module 413 is configured to support communication between the base station and the first UE, the second UE, and the like. The base station 410 may further include a storage module 411, configured to store program code and data of the base station.

The processing module 412 may be a processor or a controller, such as a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processing module 412 may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 413 may be a transceiver, a transceiver circuit, a communications interface, or the like. The storage module 411 may be a memory.

When the processing module 412 is a processor, the communications module 413 is a communications interface. When the storage module 411 is a memory, the base station in this embodiment of the present invention may be a base station shown in FIG. 16.

Figure 16:
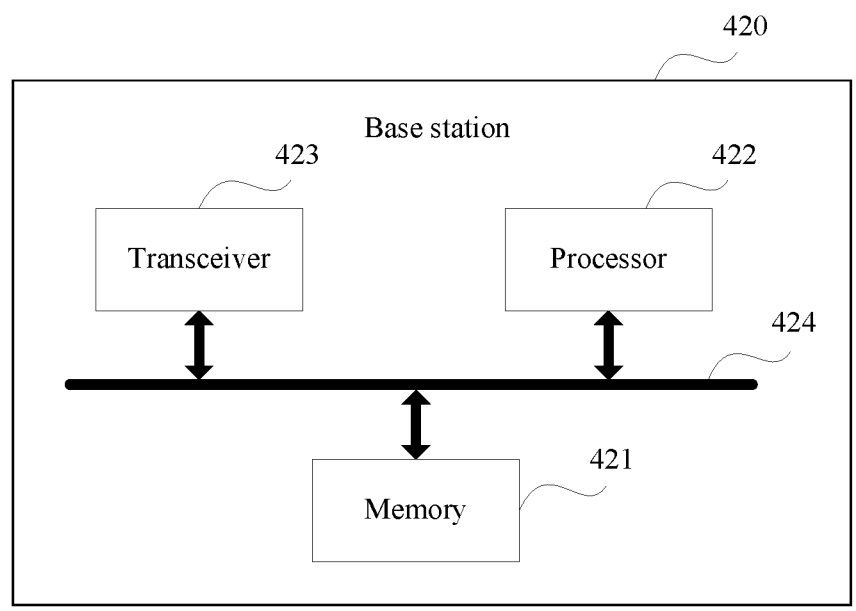
FIG. 16 is still another schematic structural diagram of a base station according to an embodiment of the present invention.

Referring to FIG. 16, the base station 420 includes a processor 422, a communications interface 423, a memory 421, and a bus 424. The communications interface 423, the processor 422, and the memory 421 are interconnected by using the bus 424. The bus 424 may be a peripheral component interconnect (PCI) bus, an extended industry standard architecture (EISA) bus, or the like. The bus may be classified into an address bus, a data bus, a control bus, and the like. For ease of representation, only one bold line is used in FIG. 16 to represent the bus 424, but it does not indicate that there is only one bus or one type of bus.

The first UE provided in the embodiments of the present invention obtains the time-frequency resource indication information and the resource cycle reservation information of the second UE in the sensing time window of the first UE, determines the energy of the first resource based on the time-frequency resource indication information of the second UE, and determines the energy of the at least one second resource based on the energy of the first resource and the resource cycle reservation information of the second UE, where the time-frequency domain location of the first resource in the transmission period in which the first resource is located is the same as the time-frequency domain location of each of the at least one second resource in the transmission period in which the second resource is located. This not only improves system resource utilization, but also reduces a possibility of a resource selection collision occurring when a plurality of UEs perform resource selection based on a sensing result.

Finally, it should be noted that the foregoing embodiments are merely intended to describe the technical solutions of the present invention but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A resource energy determining method, wherein the method comprises:
   obtaining, by first user equipment (UE), time-frequency resource indication information and resource cycle reservation information of second UE in a sensing time window of the first UE;
   determining, by the first UE, at least one third resource based on the time-frequency resource indication information of the second UE, wherein the second UE transmits same data on the at least one third resource and a first resource, the same data is one piece of data or a plurality of redundancy versions of one piece of data, and the first resource comprises a frequency domain resource of a data transmission by the second UE, and the first UE fails to decode control information corresponding to the data transmission by the second UE in a subframe in the sensing time window of the first UE;
   determining, by the first UE, energy of the first resource based on energy of the at least one third resource, wherein the energy of the at least one third resource is measured by the first UE;
   determining, by the first UE, energy of at least one second resource based on the energy of the first resource and the resource cycle reservation information of the second UE, wherein a frequency domain location of the first resource in a transmission period in which the first resource is located is the same as a frequency domain location of each of the at least one second resource in a transmission period in which the each of the at least one second resource is located; and
   selecting, by the first UE, a transmission resource based on the energy of the at least one second resource.

2. The method according to claim 1, wherein the obtaining, by the first UE, the time-frequency resource indication information of the second UE in the sensing time window of the first UE comprises:
obtaining, by the first UE, the time-frequency resource indication information of the second UE from control information corresponding to initial data transmission or data retransmission of the second UE in the transmission period in which the first resource is located.

3. The method according to claim 2, wherein the first resource comprises a frequency domain resource in a subframe in which the first UE sends data in the sensing time window of the first UE.

4. The method according to claim 2, wherein the obtaining, by the first UE, the resource cycle reservation information of the second UE in a sensing time window of the first UE comprises:
obtaining, by the first UE, the resource cycle reservation information based on configuration information sent by a base station; or
obtaining, by the first UE, the resource cycle reservation information based on preset configuration information; or
determining, by the first UE, the resource cycle reservation information based on the control information corresponding to the initial data transmission or the data retransmission of the second UE, wherein
the resource cycle reservation information comprises a resource reservation cycle and a resource cycle reservation quantity.

5. The method according to claim 4, wherein the resource reservation cycle comprises a resource cycle unit, the resource reservation cycle is an integer multiple of the resource cycle unit, and a value of the resource cycle unit is preconfigured or is configured by the base station by using the configuration information.

6. The method according to claim 4, wherein the resource reservation cycle is a fixed cycle, or the resource cycle reservation quantity is a fixed quantity.

7. The method according to claim 4, wherein the configuration information is configured by using system broadcast information or dedicated signaling of the base station.

8. The method according to claim 1, wherein the determining, by the first UE, the energy of the first resource based on energy of the at least one third resource comprises:
determining, by the first UE, an average value, a maximum value, or a minimum value of the energy of the at least one third resource as the energy of the first resource.

9. A resource energy determining apparatus, wherein the apparatus comprises:
a non-transitory memory storage comprising instructions; and
one or more hardware processors in communication with the non-transitory memory storage, wherein the one or more hardware processors execute the instructions to:
obtain time-frequency resource indication information and resource cycle reservation information of second UE in a sensing time window of the resource energy determining apparatus; and
determine at least one third resource based on the time-frequency resource indication information of the second UE, wherein the second UE transmits same data on the at least one third resource and a first resource, the same data is one piece of data or a plurality of redundancy versions of one piece of data, and the first resource is a frequency domain resource of a data transmission by the second UE, and the resource energy determining apparatus fails to decode control information corresponding to the data transmission by the second UE in a subframe in the sensing time window of the resource energy determining apparatus;
determine energy of the first resource based on energy of the at least one third resource, wherein the energy of the at least one third resource is measured by the resource energy determining apparatus;
determine energy of at least one second resource based on the energy of the first resource and the resource cycle reservation information of the second UE, wherein a frequency domain location of the first resource in a transmission period in which the first resource is located is the same as a frequency domain location of each of the at least one second resource in a transmission period in which the each of the at least one second resource is located; and
select a transmission resource based on the energy of the at least one second resource.

10. The apparatus according to claim 9, wherein the one or more hardware processors execute the instructions to:
obtain the time-frequency resource indication information of the second UE from control information corresponding to initial data transmission or data retransmission of the second UE in the transmission period in which the first resource is located.

11. The apparatus according to claim 10, wherein the first resource comprises a frequency domain resource in a subframe in which the resource energy determining apparatus sends data in the sensing time window of the resource energy determining apparatus.

12. The apparatus according to claim 10, wherein the one or more hardware processors execute the instructions to:
obtain the resource cycle reservation information based on configuration information sent by a base station; or
obtain the resource cycle reservation information based on preset configuration information; or
determine the resource cycle reservation information based on the control information corresponding to the initial data transmission or the data retransmission of the second UE, wherein
the resource cycle reservation information comprises a resource reservation cycle and a resource cycle reservation quantity.

13. The apparatus according to claim 12, wherein the resource reservation cycle comprises a resource cycle unit, the resource reservation cycle is an integer multiple of the resource cycle unit, and a value of the resource cycle unit is preconfigured or is configured by the base station by using the configuration information.

14. The apparatus according to claim 12, wherein the resource reservation cycle is a fixed cycle, or the resource cycle reservation quantity is a fixed quantity.

15. The apparatus according to claim 12, wherein the configuration information is configured by using system broadcast information or dedicated signaling of the base station.

16. The apparatus according to claim 9, wherein the one or more hardware processors execute the instructions to:
determine an average value, a maximum value, or a minimum value of the energy of the at least one third resource as the energy of the first resource.

17. A non-transitory computer-readable medium containing instructions which, when executed, cause a first user equipment (UE) to perform operations comprising:

obtaining, by the first UE, time-frequency resource indication information and resource cycle reservation information of second UE in a sensing time window of the first UE;

determining, by the first UE, at least one third resource based on the time-frequency resource indication information of the second UE, wherein the second UE transmits same data on the at least one third resource and a first resource, the same data is one piece of data or a plurality of redundancy versions of one piece of data, and the first resource comprises a frequency domain resource of a data transmission by the second UE, and the first UE fails to decode control information corresponding to the data transmission by the second UE in a subframe in the sensing time window of the first UE;

determining, by the first UE, energy of the first resource based on energy of the at least one third resource, wherein the energy of the at least one third resource is measured by the first UE;

determining, by the first UE, energy of at least one second resource based on the energy of the first resource and the resource cycle reservation information of the second UE, wherein a frequency domain location of the first resource in a transmission period in which the first resource is located is the same as a frequency domain location of each of the at least one second resource in a transmission period in which the each of the at least one second resource is located; and selecting, by the first UE, a transmission resource based on the energy of the at least one second resource.

18. The non-transitory computer-readable medium according to claim 17, wherein the obtaining, by the first UE, the time-frequency resource indication information of the second UE in the sensing time window of the first UE comprises:

obtaining, by the first UE, the time-frequency resource indication information of the second UE from control information corresponding to initial data transmission or data retransmission of the second UE in the transmission period in which the first resource is located.

19. The non-transitory computer-readable medium according to claim 18, wherein the first resource comprises a frequency domain resource in a subframe in which the first UE sends data in the sensing time window of the first UE.

20. The non-transitory computer-readable medium according to claim 17, wherein the determining, by the first UE, the energy of the first resource based on energy of the at least one third resource comprises:

determining, by the first UE, an average value, a maximum value, or a minimum value of the energy of the at least one third resource as the energy of the first resource.

* * * * *